United States Patent
Sorgi

(10) Patent No.: US 6,168,410 B1
(45) Date of Patent: *Jan. 2, 2001

(54) APPARATUS FOR THE EXPANSION AND/OR HEAT TREATMENT OF OLEO RESINOUS MATERIAL

(75) Inventor: Carlos Sorgi, Ourinhos (BR)

(73) Assignee: TNL Industrial Mecanica Ltda., Ourinhos (BR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/908,783

(22) Filed: Aug. 8, 1997

(51) Int. Cl.[7] .................................................. B29C 47/08
(52) U.S. Cl. ......................... 425/186; 425/190; 425/381; 425/466
(58) Field of Search ..................................... 425/186, 190, 425/192 R, 380, 381, 466, 467; 426/489

(56) References Cited

U.S. PATENT DOCUMENTS

| | | |
|---|---|---|
| 1,775,735 | 9/1930 | Reker . |
| 2,979,768 | * 4/1961 | Nichols . |
| 3,191,229 | * 6/1965 | Vanzo . |
| 3,632,246 | * 1/1972 | Ichikawa et al. . |
| 3,807,929 | * 4/1974 | Moore . |
| 4,097,213 | 6/1978 | McComb et al. . |
| 4,097,214 | * 6/1978 | Hsu ....................................... 425/466 |
| 4,255,110 | 3/1981 | Otsuka . |
| 4,794,011 | * 12/1988 | Schumacher . |
| 4,901,635 | 2/1990 | Williams . |
| 4,931,237 | * 6/1990 | Peelman et al. ...................... 425/467 |
| 4,960,328 | 10/1990 | Schumacher et al. . |
| 5,271,728 | * 12/1993 | Froidevaux et al. . |
| 5,366,680 | 11/1994 | Foresman . |

* cited by examiner

Primary Examiner—Robert Davis
Assistant Examiner—Joseph Leyson
(74) Attorney, Agent, or Firm—Walker, McKenzie & Walker, P.C.

(57) ABSTRACT

Apparatus for the expansion and/or heat treatment of oleo resinous material of the type which includes a tubular housing having a rotatably driven screw for conveying material to be treated towards the outlet end of the tubular housing. An outlet discharge device is adjacent the outlet end of the housing for providing for the discharge of the material from the outlet end. The outlet discharge device includes a main ring attached to the housing at the outlet end. The head in the preferred embodiment has a plurality of teeth and depressions around the periphery of the head and the main ring also has a plurality of matching teeth and depressions in the inner circumference thereof. Alternatively, the peripheral face of the head and the inner circumference of main ring may be without depressions and teeth, but instead may respectively be in the form of a continuous face. A hydraulic actuator is attached to the head for selectively moving the head between an operating position in which the head is proximate the main ring and a cleaning position in which the head is substantially spaced from the main ring. The actuator has a control system for selectively directing hydraulic fluid to move the head from and to the operating and cleaning positions. A limiting ring is provided for limiting the position of the head relative to the main ring when in the operating position.

5 Claims, 3 Drawing Sheets

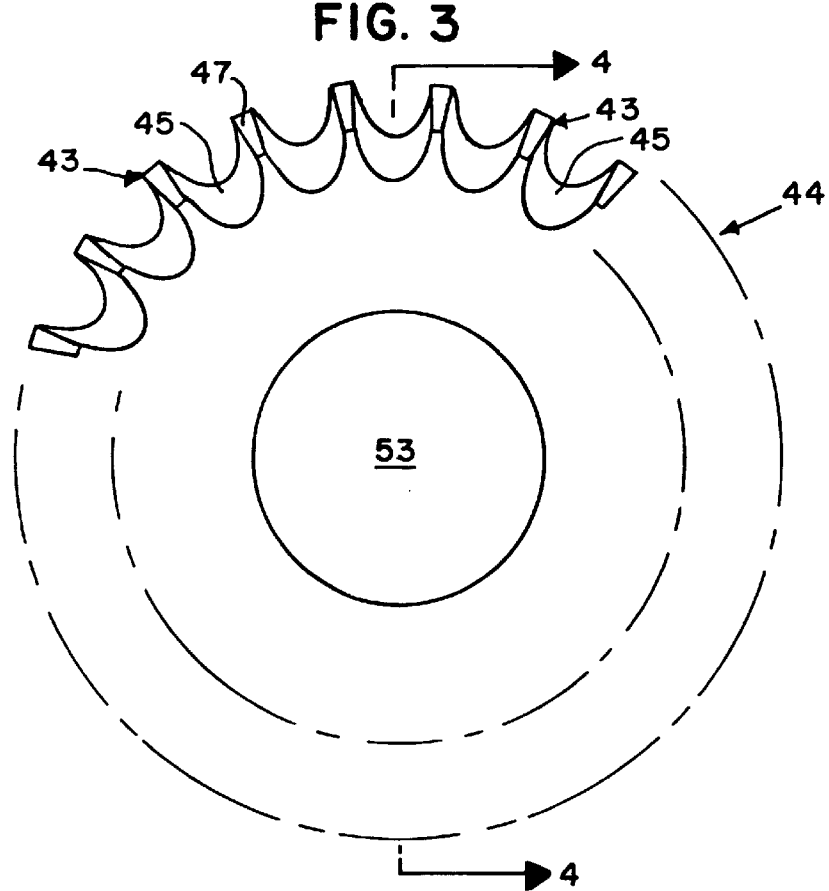
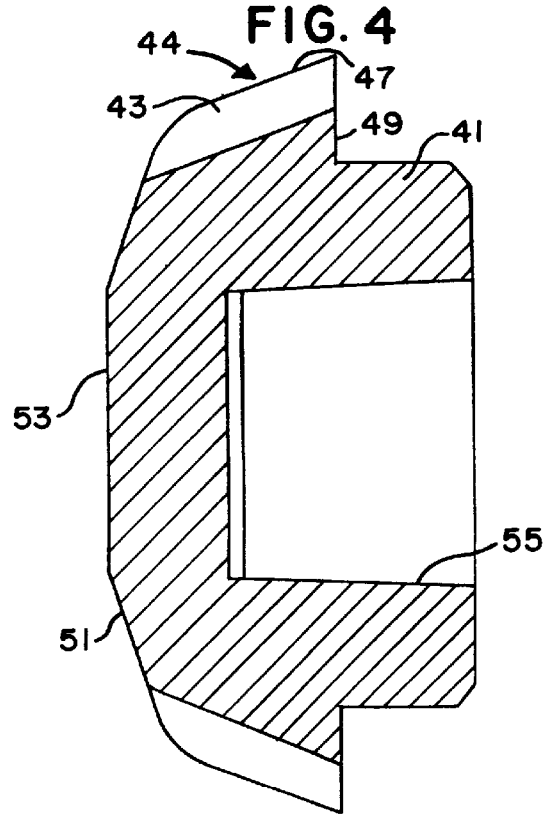

APPARATUS FOR THE EXPANSION AND/OR HEAT TREATMENT OF OLEO RESINOUS MATERIAL

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

The present invention relates, in general, to an improvement in an apparatus for the expansion and/or heat treatment of oleo resinous material, that is, oil seeds, as for example, cotton seed or soybean flakes. The apparatus upon which the present invention is an improvement is an intermediate apparatus or step in oil seed processing and is useful for the preparation of the oil seeds for subsequent extraction of the oils.

2. Information Disclosure Statement

It is often desired to shut down such apparatus for various reasons, and when the prior art apparatus which typically had a die-plate with apertures through which the processed material was expelled was shut down, it created a problem, particularly if the material became caked, hardened, or not usable up in the exit end of the apparatus and cleaning for restarting the apparatus could not be accomplished without removing the die-plate. It will be understood that such down time is costly in that valuable production was lost. It is therefore desirable to have a way to easily and quickly clean out the apparatus with a minimum of down time.

A preliminary patentability search in Class 425, subclasses 133.1, 381, and 382 produced the following patents, some of which may be relevant to the present invention: Reker, U.S. Pat. No. 1,775,735, issued Sep. 16, 1930; McComb et al., U.S. Pat. No. 4,097,213, issued Jun. 27, 1978; Otsuka, U.S. Pat. No. 4,255,110, issued Mar. 10, 1981; and Foresman, U.S. Pat. No. 5,366,680, issued Nov. 22, 1994.

Additionally, Schumacher, deceased et al., U.S. Pat. No. 4,960,328, issued Oct. 2, 1990, describes apparatus for the extrusion, expansion and/or thermal treatment of substances and substance mixtures. Williams, U.S. Pat. No. 4,901,635, issued Feb. 20, 1990, describes apparatus and method for the continuous extrusion and partial deliquefaction of oleaginous materials. None of these references, either singly or in combination, disclose or suggest the present invention.

BRIEF SUNIMARY OF THE INVENTION

The present invention is an improvement in an apparatus of the type for the expansion and/or heat treatment of oleo resinous material in which the fixed die plate of previous apparatuses of this type is replaced with a hydraulically positioned device that produces virtually the same quality of material as the previous apparatuses and may be remotely started and stopped without operator assistance or care.

It is an object of the present invention to provide an improved apparatus of the above described type which can be easily and quickly cleaned with a minimum of down time.

A further object is to provide such improved apparatus in which the improved outlet discharge device includes a main ring attached to the housing of the apparatus at the outlet end thereof, a head including a plurality of teeth around the periphery of the head and including a plurality of depressions respectively disposed between the teeth, said main ring including a plurality of teeth around the inner circumference of the main ring and including a plurality of depressions respectively disposed between the teeth, and actuating means attached to the head for selectively moving the head between an operating position and a cleaning position. When in the operating position the teeth are proximate to the ring, and the head with the main ring provides a plurality of passageways for the material to exit the housing, and when in the cleaning position the head is withdrawn from the main ring and the outlet end of the housing to allow cleaning out of said apparatus and expelling of the material.

A further object is to provide an embodiment of such an improved apparatus in which the head is in contact with the main ring when in said operating position.

A further object is to provide another embodiment of such an improved apparatus in which there are no depressions around the periphery of the head, and in which the surface of the head around the periphery thereof is substantially solid. In this embodiment the head is spaced from the main ring when in said operating position.

A further object is to provide such an improved apparatus in which is provided a limiting ring for limiting the amount of space between the head and the main ring when in said operating position.

A further object is to provide such an improved apparatus which includes a hydraulic cylinder/piston combination with the piston thereof being connected to the head for the actuation thereof, and includes hydraulic source means and a control system connecting the hydraulic source means to the hydraulic/piston combination for the selective movement of the head.

BRIEF DESCRIPTION OF THE SEVERAL VIEWS OF THE DRAWING

FIG. 3 is an end elevational view of the head of the improved apparatus of the present invention.

FIG. 4 is a sectional view taken as on the line 4—4 of FIG. 3.

DETAILED DESCRIPTION OF THE INVENTION

Figure 1:
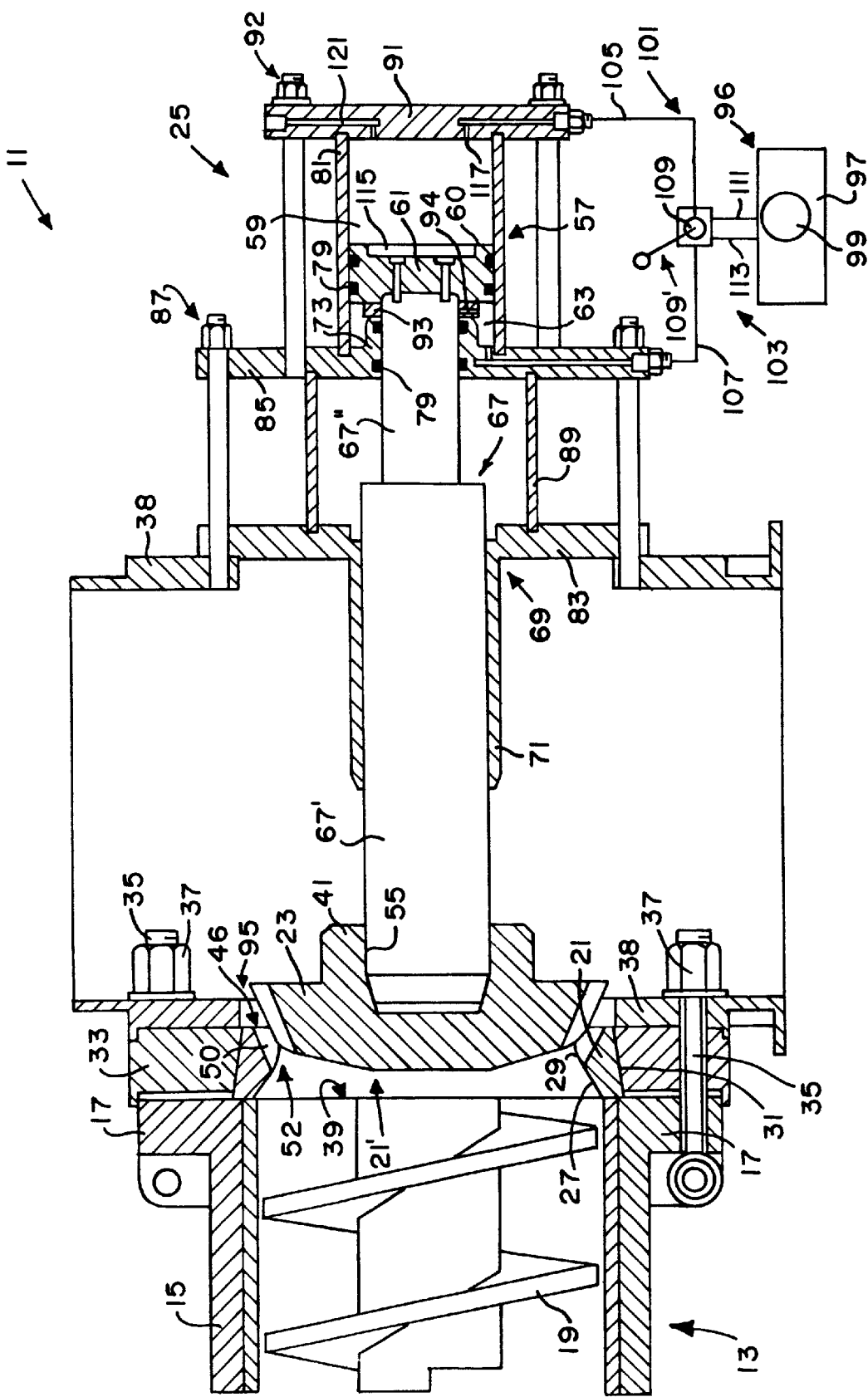
FIG. 1 is a partly sectionalized view along the longitudinal centerline of the improved apparatus of the present invention illustrating the apparatus in one operating position, and with parts of the apparatus being shown diagrammatically.

Referring now to the drawings, the improved outlet discharge device 11 of the present invention is used in combination with a suitable apparatus of known construction for the expansion and/or heat treatment of oleo resinous material and the like to provide an overall improved apparatus for the expansion and/or heat treatment of oleo resinous material and the like. An apparatus 13 of suitable typical construction, such as model No. EXP 250 manufactured by Grupo Technal of Ourinhos, Brazil, a portion of which is shown in the FIGS. 1 & 2, basically includes a tubular housing 15 having an inlet end, not shown, an outlet end 17, and a rotatably driven screw conveyor 19 mounted within housing 15 for conveying the material to be treated through the tubular housing 15 in a direction towards the outlet end 17 of the housing. The improved outlet discharge device 11 of the present invention is located adjacent the outlet end 17 of tubular housing 15 for providing for the discharge of the material from the outlet end of housing 15, and is used in place of previous discharge devices such as a stationary flat circular plate fixed across the outlet end of the housing that was used in the above mentioned Model No. EXP 250. The flat circular plate of Model No. EXP 250 had apertures therein through which the material was expelled.

The outlet discharge device 11 of the present invention includes, in general, a main ring 21, a head 23, and an actuator or actuating means 25. More particularly, main ring 21 is preferably formed of hardened tool steel and is annular in shape with a first sloping face 27 that slopes outwardly and rearwardly towards outlet end 17, an inner circumference or second sloping inner face 29 that slopes inwardly and rearwardly towards outlet end 17 and a third sloping face 31 that slopes outwardly and rearwardly towards outlet end 17 (see FIG. 2). Main ring 21 defines an opening 21' through the center thereof. It will be understood that the term "rearwardly" as used in this specification is intended to denote a direction towards the left as viewed in FIGS. 1 & 2, and "forwardly" is intended to denote a direction towards the right in FIGS. 1 & 2. Main ring 21 is held fixedly in place onto the open outlet end 17 of tubular housing 15 by suitable means, which is preferably a holding ring 33 that surrounds main ring 21 and which in turn is held in place by suitable means such as the anchoring bolts 35 and nuts 37. The anchoring bolts 35 at the rearward ends thereof are attached to the flanged outlet end 17 of tubular housing 15. Bolts 35 extend through aligned openings in the flanged outlet end 17 of tubular housing 15, in holding ring 33 and in the side of housing 38. A central opening 39 is provided in housing 15 substantially in alignment with opening 21' of main ring 21 but preferably slightly larger in diameter than the diameter of main ring opening 21'.

Head 23 is preferably substantially in the shape of a cone as shown in the drawings and includes a neck portion 41. Head 23 is also preferably of hardened tool steel and preferably, though not necessarily, includes a plurality of teeth 43 spaced evenly around the periphery 44 of head 23. Head 23 also preferably includes depressions 45 respectively disposed between teeth 43. Although in FIG. 3 only some of the teeth 43 are shown for purposes of illustration, it will be understood that the teeth preferably extend completely around head 23. The outer edges 47 of teeth 43 lie in an imaginary frusto-conical face or periphery preferably sloped downwardly and rearwardly from the stepped shoulder portion 49 of head 23. In other words, if depressions 45 were not provided in the periphery 44 of head 23, the resulting peripheral face of head 23 would be substantially solid and in the shape of a frustum of a cone. The angle of slope of each of the respective outer edges 47 of teeth 43 is substantially the same angle as the angle of slope of second face 29 of main ring 21. Each of depressions 45 are preferably rounded and concave in construction and slope at the same angle of slope of the outer edges 47 of teeth 43. In the preferred embodiment of main ring 21, shown in FIG. 1, the main ring is preferably provided with depressions 46 and teeth 50 on the inner circumference thereof which are similar to and respectively match depressions 45 and teeth 43, and preferably overlap at least portions of depressions 45 and teeth 43 so that depressions 45, 46 form a plurality of passageways 52 when in an operating position as shown in FIG. 1. Also, the radii of the depressions 45, 46 are respectively the same length. The angle of slope of each of the respective outer edges of teeth 50 on main ring 21 is substantially the same angle as the angle of slope of the outer edges of teeth 43 on head 23 so that head 23 preferably fits partially or completely within main ring 21 with the respective outer edges of teeth 43 and teeth 50 being proximate to one another, i.e., closely adjacent but spaced or touching one another. Each of depressions 46 are preferably rounded and concave in construction and slope at the same angle as the angle of slope of the outer edges of teeth 50. Each of the depressions 45 preferably form one half of a cylinder and each of the corresponding depressions 46 form the other half of the cylinder so that at least the proximate portions of the two halves together form a substantially complete cylinder whereby each of passageways 52 are preferably substantially cylindrical.

The depressions 45, 46 may be formed during the manufacture of device 11 by placing head 23 and ring 21 together and drilling through both at the same time so that passageways 52 have a circular appearance when viewed from the ends thereof. It will be understood that the sloping face 29 of main ring 21 becomes the outer edges of teeth 50 and the outer periphery of head 23 becomes the outer edge 47 of teeth 43 when head 23 and ring 21 are drilled together as above described.

Preferably, there are forty depressions 45 on head 23 and forty depressions 46 on ring 21, although more or less may be provided on either or both head 23 and ring 21 without departing from the spirit and scope of the present invention.

If desired, the periphery 44 of head 23 may be provided without depressions 45 in which case the peripheral face of periphery 44 would be in the actual shape of the frustum of a cone, and would provide a substantially solid, continuous, and even periphery or face of head 43. Also, if desired, the inner circumference of main ring 21 may be provided without depressions 46 in which case the inner circumference of main ring 21 would substantially match the shape of the peripheral face of periphery 44, and would provide a substantially solid, continuous, and even inner circumference or inner face 29 of main ring 21.

The central portion of the rearward face 51 of head 23 is preferably flattened as at 53. The forward end of head 23 is provided with a central socket 55 for a purpose later to be described.

Actuating means 25 includes, in general, a hydraulic cylinder and piston combination 57 having a first chamber 59 adjacent a first end 60 of the piston 61 of combination 57 remote from head 23 and a second chamber 63 adjacent the other or second end 65 of piston 61. Actuating means 25 functions in a manner to be described later to selectively move head 23 between an operating position shown in FIG. 1 and a cleaning position shown in FIG. 2. Actuating means 25 additionally includes a shaft 67 interconnecting piston 61 and head 23, and supporting means 69 that includes suitable bearings 71, 73, well known to those skilled in the art, encircling shaft 67 for movably supporting shaft 67 so that shaft 67, piston 61, and head 23 are movable together longitudinally to carry head 23 between the operating position shown in FIG. 1 and the cleaning position shown in FIG. 2. The rearward end of shaft 67 is fixedly mounted in the central socket 55 of head 23 by suitable means, as for example, by press fitting the parts together, well known to those skilled in the art. The rearward portion 67' of shaft 67 preferably extends through bearing 71. The forward portion 67" of shaft 67 is preferably reduced in diameter and extends though bearing 73. Piston 61 is fixedly attached to the forward end of shaft forward portion 67" by suitable well known means such as bolts 77 extending through openings in piston 61 and extending into threaded sockets in the forward end of forward portion 67" of shaft 67. Suitable O-rings 79 or the like are provided for sealing against leakage between piston 61 and cylinder 81 of piston/cylinder combination 57 and for sealing against leakage between forward portion 67" of shaft 67 and bearing 73.

Supporting means 69 preferably additionally includes a first annular disk 83 supporting bearing 71 from housing 38 and a second annular disk 85 supporting bearing 73 from housing 38. Attaching means such as bolts/nuts 87 connect disks 83 and 85 together and to housing 38. A cylindrical spacer 89 is disposed between disks 83, 85 and is clampingly held between disks 83, 85 by bolts/nuts 87.

Actuating means 25 includes an end plate 91 which is preferably supported from second disk 85 by bolts/nuts 92. Cylinder 81 is clampingly held between end plate 91 and second disk 85. It will be understood that the center portion of the rearward side of end plate 91 defines the end wall of first chamber 59. The forward side of piston 61 defines the opposite wall of first chamber 59, and the inside wall of cylinder 81 between end plate 91 and piston 61 defines the inner cylindrical wall of first chamber 59. The second chamber 63 is provided in cylinder 81 on the opposite side of piston 61 from first chamber 59. Also, it will be understood that the size of first chamber 59 and second chamber 63 vary as piston 61 is moved, as described later in the specification.

Figure 2:
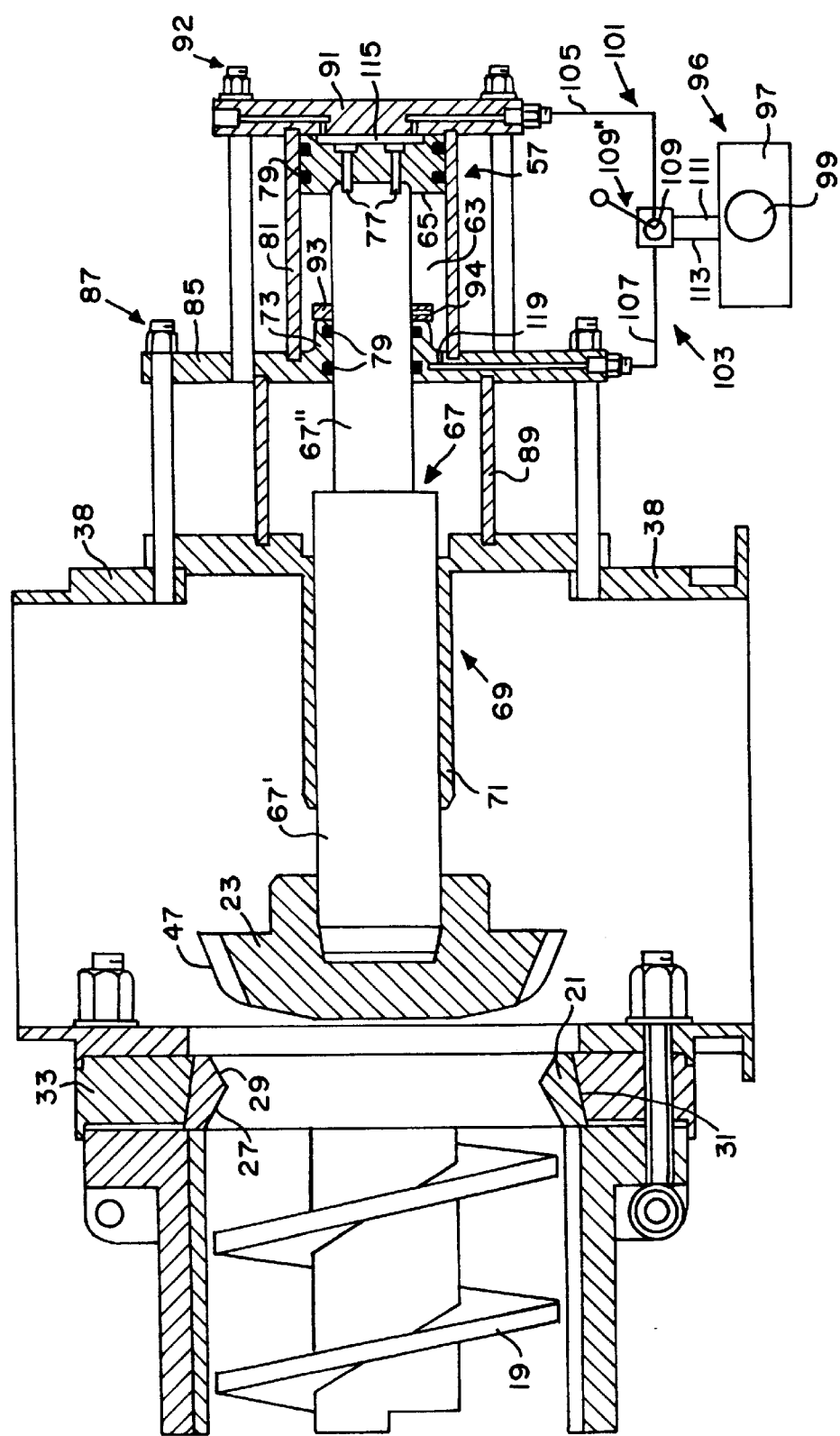
FIG. 2 is a view similar to FIG. 1 except that the improved apparatus is illustrated in a cleaning position and the main ring is shown in an alternate configuration in which the main ring is not provided with teeth.

Outlet discharge device 11 includes annular limiter means or limiting ring 93 provided on forward portion 67" of shaft 67 between the rearward end of piston 61 and bearing 73 for contacting bearing 73 to limit rearward movement of shaft 67 to stop head 23 in the operating position shown in FIG. 1, in which operating position head 23 is preferably in a proximate position, i.e., closely adjacent but spaced from main ring 21 or touching main ring 21. Limiting ring 93 encircles forward portion 67" of shaft 67 and is provided with suitable means for locking limiting ring 93 at a selected location on shaft portion 67", as for example, a lock nut or set screw 94, well known to those skilled in the art, to fixedly set the limiting ring at a position to give the desired size of the space or passageway 95 for the material to be emitted between head 23 and main ring 21. Limiting ring 93 is preferably slidable relative to shaft portion 67" so that when the set screw 94 is loosened limiting ring 93 can move on shaft portion 67". In FIGS. 1 & 2 the set screw 94 is in such a loosened position. Thus, it so happens that with the limiting ring 93 against bearing 73 and the set screw 94 loosened, in moving from the cleaning position shown in FIG. 2 to the operating position shown in FIG. 1 the limiting ring 93 remains in contact with bearing 73 and shaft portion 67" simply slides through the limiting ring until piston 61 contacts limiting ring 93 whereupon head 23 is stopped in the operating position. Alternatively, if desired, the parts may be so constructed that when head 23 is in the operating position, head 23 will directly contact bearing 73 to stop the rearward movement of piston 61 in which case there is no need for limiting ring 93. However, if the capability of adjustment of the size of passageway 95 is desired the set screw 94 or the like should be provided. Also, this adjustment ensures flexibility as well as a maximum safe displacement point of head 23 without contacting main ring 21 when this is the desired goal.

Outlet discharge device 11 includes hydraulic source means 96 including a hydraulic fluid tank 97 and a pump 99 for supplying hydraulic fluid from the fluid tank to the hydraulic and piston combination 57.

Additionally, outlet discharge device 11 includes a control system 101 comprising hydraulic circuit means 103 including a first circuit means portion 105 connected to first chamber 59, a second circuit means portion 107 connected to second chamber 63, a two-way valve means 109 having a first position 109' shown in FIG. 1 and a second position 109" shown in FIG. 2, and a third circuit means portion 111 interconnecting pump 99 and two-way valve means 109. Two-way valve means 109 is selectively connected to first circuit means portion 105 and second circuit means portion 107 for respectively selectively directing hydraulic fluid to first chamber 59 of hydraulic cylinder 81 when two-way valve means 109 is in first position 109' to move head 23 to the operating position shown in FIG. 1 and for directing hydraulic fluid to second chamber 63 of hydraulic cylinder 81 when two-way valve 109 is in the second position 109" shown in FIG. 2 to move head 23 to the cleaning position. Also, two-way valve means 109 directs return fluid back to the fluid tank 97 through a fourth circuit means portion 113 respectively from the first or second chambers 59, 63, as is necessary, and in a manner well known to those skilled in the art. Additionally, it should be pointed out that the forward end of piston 61 is recessed as at 115 to allow flow of fluid to and from port 117 that connects first circuit means portion 105 to first chamber 59. Also, it should be pointed out that port 119 connects second circuit means portion 107 to second chamber 63, and channel 121 which also connects to first chamber 59 may be utilized to connect any desired means to the outer end thereof, as for example, a bleed valve, pressure gauge, etc., not shown and well known to those skilled in the art.

It will be understood that during the operation of the outlet discharge device 11 as above described when head 23 is in the operating position shown in FIG. 1 and the apparatus 13 is turned on to cause oleo resinous material or the like to be conveyed forwardly, i.e., to the right as viewed in FIG. 1 through tubular housing 15 by screw conveyor 19, the material will be expressed outwardly and in a forwardly direction. Also, it will be understood that when it is desired to operate apparatus 13 with head 23 in contact with main ring 21 there would have to be a passageway or passageways, such as passageways 52, depressions 45, 46 or other type passageways, not shown, provided in head 23 adjacent main ring 21 and/or provided in main ring 21 adjacent head 23 for the material to be expressed outwardly through such a passageway or passageways.

When outlet discharge 11 is in the cleaning position shown in FIG. 2, it will be understood that head 23, the outlet end 17 of tubular housing 15 and the surrounding parts of apparatus 13 and outlet discharge 11 can be easily cleaned of the oleo resinous material without shutting apparatus 13 down for extended periods of time as in the past when the apparatus which had an apertured disk at the outlet end 17 of tubular housing 15 and had to be removed for the cleaning of the apparatus.

Although the present invention has been described and illustrated with respect to a preferred embodiment and a preferred use therefor, it is not to be so limited since modifications and changes can be made therein which are within the full intended scope of the invention.

I claim:

1. An apparatus for the expansion and/or heat treatment of oleo resinous material, said apparatus including a substantially tubular housing having an inlet end and an outlet end, and said apparatus further including a rotatably driven screw conveyor mounted within said housing for conveying the material to be treated through the housing in a direction towards the outlet end of the housing, wherein the improvement comprises an outlet discharge device adjacent the outlet end of the housing for providing for the discharge of the material from the outlet end of the housing, said outlet discharge device comprising:

(a) a main ring attached to said tubular housing at the outlet end thereof, said main ring including a first plurality of first teeth on an inner circumference of said main ring, and said main ring having a first plurality of first depressions respectively disposed between said first teeth;

(b) a head including a second plurality of second teeth around a periphery of said head, said head having a second plurality of second depressions respectively disposed between said second teeth; said first plurality of said first teeth being the same in number as said second plurality of said second teeth; said first plurality of said first depressions being the same in number as said second plurality of said second depressions; and (c) actuating means attached to said head for selectively moving said head between an operating position and a cleaning position; such that, when in said operating position, said first plurality of said first teeth are in respective contact with said second plurality of said second teeth with each tooth of said first plurality of first teeth being in fixed alignment contact with its respective tooth of said second plurality of said second teeth so that said first plurality of said first depressions and said second plurality of said second depressions form substantially cylindrical passageways for the material to exit said housing therethrough; and such that, when in said cleaning position, said head is withdrawn from said main ring and from said outlet end of said housing, and said first plurality of said first teeth are remote from said second plurality of said second teeth, to allow cleaning out of said apparatus and expelling of the material.

2. The apparatus of claim 1 in which said actuating means includes a hydraulic cylinder and piston combination having a first chamber on a side of said piston remote from said head and a second chamber on the other side of said piston, a shaft interconnecting said piston and said head, supporting means for movably supporting said shaft so that said shaft, said piston, and said head are movable together longitudinally to carry said head between said operating position and said cleaning position.

3. An apparatus for the expansion and/or heat treatment of oleo resinous material, said apparatus including a substantially tubular housing having an inlet end and an outlet end, and said apparatus further including a rotatably driven screw conveyor mounted within said housing for conveying the material to be treated through the housing in a direction towards the outlet end of the housing, wherein the improvement comprises an outlet discharge device adjacent the outlet end of the housing for providing for the discharge of the material from the outlet end of the housing, said outlet discharge device comprising:

(a) a main ring attached to said tubular housing at the outlet end thereof, said main ring including a first plurality of first teeth on an inner circumference of said main ring, and said main ring having a first plurality of first depressions respectively disposed between said first teeth;

(b) a head including a second plurality of second teeth around a periphery of said head, said head having a second plurality of second depressions respectively disposed between said second teeth; said first plurality of said first teeth being the same in number as said second plurality of said second teeth; said first plurality of said first depressions being the same in number as said second plurality of said second depressions;

(c) actuating means attached to said head for selectively moving said head between an operating position and a cleaning position; such that, when in said operating position, said first plurality of said first teeth are in respective contact with said second plurality of said second teeth with each tooth of said first plurality of first teeth being in fixed alignment contact with its respective tooth of said second plurality of said second teeth so that said first plurality of said first depressions and said second plurality of said second depressions form substantially cylindrical passageways for the material to exit said housing therethrough; and such that, when in said cleaning position, said head is withdrawn from said main ring and from said outlet end of said housing, and said first plurality of said first teeth are remote from said second plurality of said second teeth, to allow cleaning out of said apparatus and expelling of the material, said actuating means including:

(i) a hydraulic cylinder and piston combination having a first chamber on a side of said piston remote from said head and a second chamber on the other side of said piston, (ii) a shaft interconnecting said piston and said head, and (iii) supporting means for movably supporting said shaft so that said shaft, said piston, and said head are movable together longitudinally to carry said head between said operating position and said cleaning position, and said supporting means including a bearing means encircling said shaft;

(d) hydraulic source means including:

(i) a hydraulic fluid tank, and (ii) a hydraulic pump for supplying hydraulic fluid to said hydraulic cylinder and piston combination, and (e) a control system comprising hydraulic circuit means including a first circuit means portion connected to said first chamber, a second circuit means portion connected to said second chamber, a two-way valve means having a first and second position, and a third circuit means portion interconnecting said pump and said two-way valve means, said two-way valve means being selectively connected to said first circuit means portion and said second circuit means portion for selectively directing hydraulic fluid to said first chamber of said hydraulic cylinder when said two-way valve means is in said first position to move said head to said operating position and for directing hydraulic fluid to said second chamber of said hydraulic cylinder when said two-way valve is in said second position to move said head to said cleaning position.

4. The apparatus of claim 3 in which said second plurality of said second teeth have outer ends, and said head is provided with a peripheral face with the outer ends of said second plurality of said second teeth being disposed in an imaginary outline that is substantially frusto-conical in shape.

5. The apparatus of claim 1 in which said second plurality of said second teeth have outer ends, and said head is provided with a peripheral face with the outer ends of said second plurality of said second teeth being disposed in an imaginary outline that is substantially frusto-conical in shape.

* * * * *